US012683065B2

(12) United States Patent
Ishida et al.

(10) Patent No.: US 12,683,065 B2
(45) Date of Patent: Jul. 14, 2026

(54) COIL COMPONENT

(71) Applicant: Murata Manufacturing Co., Ltd., Kyoto-fu (JP)

(72) Inventors: Masayuki Ishida, Nagaokakyo (JP); Hiroyuki Honda, Nagaokakyo (JP); Takuma Sagara, Nagaokakyo (JP); Shingo Nakamoto, Nagaokakyo (JP); Takuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 689 days.

(21) Appl. No.: 18/313,157

(22) Filed: May 5, 2023

(65) Prior Publication Data

US 2023/0368965 A1 Nov. 16, 2023

(30) Foreign Application Priority Data

May 11, 2022 (JP) ................................ 2022-078362

(51) Int. Cl.

*H01F 27/28* (2006.01)
*H01F 27/29* (2006.01)
*H01F 27/30* (2006.01)

(52) U.S. Cl.

CPC ....... *H01F 27/2828* (2013.01); *H01F 27/292* (2013.01); *H01F 27/306* (2013.01)

(58) Field of Classification Search

CPC .. H01F 27/2828; H01F 27/292; H01F 27/306; H01F 5/04; H01F 17/045; H01F 27/29; H01F 27/24

USPC .................................... 336/65, 83, 192, 200

See application file for complete search history.

(56) References Cited

U.S. PATENT DOCUMENTS

| | | | | |
|---|---|---|---|---|
| 11,817,844 | B2 * | 11/2023 | Asai | H03H 1/00 |
| 2015/0162126 | A1 * | 6/2015 | Kanbe | H01F 27/2823 29/605 |
| 2018/0211764 | A1 * | 7/2018 | Komaya | H01F 17/04 |
| 2018/0366259 | A1 * | 12/2018 | Mikogami | H01F 41/06 |
| 2021/0391110 | A1 * | 12/2021 | Kunitsuka | H01F 17/045 |

FOREIGN PATENT DOCUMENTS

JP 2019-121692 A 7/2019

* cited by examiner

*Primary Examiner* — Tuyen T Nguyen

(74) *Attorney, Agent, or Firm* — Studebaker Brackett PLLC

(57) ABSTRACT

A coil component includes a drum core including a winding core portion, first and second flange portions, a first metal terminal attached to the first flange portion, and a first wire. The first flange portion is connected to a first end of the winding core portion in a direction along a central axis of the winding core portion. A first connection end of the first wire is joined to the first metal terminal. When viewed in a direction orthogonal to both a first positive direction and the inward direction, an acute angle formed by a virtual straight line parallel to the central axis and a tangent at an end of an inclined surface of the first metal terminal in the inward direction is larger than an acute angle formed by a virtual straight line and a tangent at an end of the inclined surface in the outward direction.

7 Claims, 5 Drawing Sheets

COIL COMPONENT

CROSS-REFERENCE TO RELATED APPLICATION

This application claims benefit of priority to Japanese Patent Application No. 2022-078362, filed May 11, 2022, the entire content of which is incorporated herein by reference.

BACKGROUND

Technical Field

The present disclosure relates to a coil component.

Background Art

The coil component described in Japanese Patent Application Laid-Open No. 2019-121692 includes a winding core portion and two flange portions. The winding core portion has a quadrangular prism shape. The two flange portions are connected to both ends of the winding core portion. Each flange portion protrudes outward from the winding core portion in a direction orthogonal to a central axis of the winding core portion. The material of the winding core portion and the flange portion is a magnetic material. The winding core portion and the flange portion constitute a core of the coil component.

The coil component includes a plurality of metal terminals and two wires. When a direction orthogonal to the central axis of the winding core portion is a width direction, each metal terminal is attached to an end of each flange portion in the width direction. Each wire is wound around the winding core portion. An end portion of each wire is drawn out from the winding core portion and thermocompression-bonded to the metal terminal. As a result, the thermocompression-bonded portion of the wire is crushed and flattened.

SUMMARY

In the coil component described in Japanese Patent Application Laid-Open No. 2019-121692, the wire is bent at a portion drawn out from the end portion to the winding core portion. When the wire is rapidly bent at a specific portion, disconnection may occur at the bent portion.

Accordingly, the present disclosure provides a coil component including a drum core including a columnar winding core portion, a first flange portion connected to a first end of the winding core portion in a direction along a central axis of the winding core portion, and a second flange portion connected to a second end of the winding core portion opposite to the first end; a first metal terminal attached to the first flange portion; and a wire wound around the winding core portion and having a first connection end joined to the first metal terminal. The first flange portion protrudes outward with respect to the winding core portion in a first positive direction orthogonal to the central axis. The first metal terminal includes a joining portion facing a surface of the first flange portion facing the first positive direction. A first connection end of the wire is joined to a surface of the joining portion facing the first positive direction side. Also, when a direction from the first metal terminal toward the winding core portion in a direction along the central axis is defined as an inward direction, a direction opposite to the inward direction is defined as an outward direction, and a direction opposite to the first positive direction is defined as a first negative direction, the joining portion has an inclined surface located in the first negative direction toward the inward direction on a surface facing the first positive direction side, and the inclined surface reaches an end of the joining portion on the inward direction side. Also, when viewed in a direction orthogonal to both the first positive direction and the inward direction, an acute angle formed by a virtual straight line parallel to the central axis and a tangent at an end of the inclined surface in the inward direction is larger than an acute angle formed by the virtual straight line and a tangent at an end of the inclined surface in the outward direction.

According to the above configuration, the inclined surface of the first metal terminal is gradually inclined stepwise or continuously as it goes toward the inward direction. With such an inclined surface, when the wire is placed along the inclined surface, the wire is not rapidly bent at a specific portion. Therefore, disconnection of the wire can be prevented from occurring at the bent portion of the wire.

According to one aspect of the present disclosure, disconnection of the wire can be suppressed.

DETAILED DESCRIPTION

Hereinafter, an embodiment of a coil component will be described. The drawings may show enlarged components to facilitate understanding. The dimensional ratios of the components may be different from the actual ones or those in another drawing.

<Overall Configuration>

Figure 1:
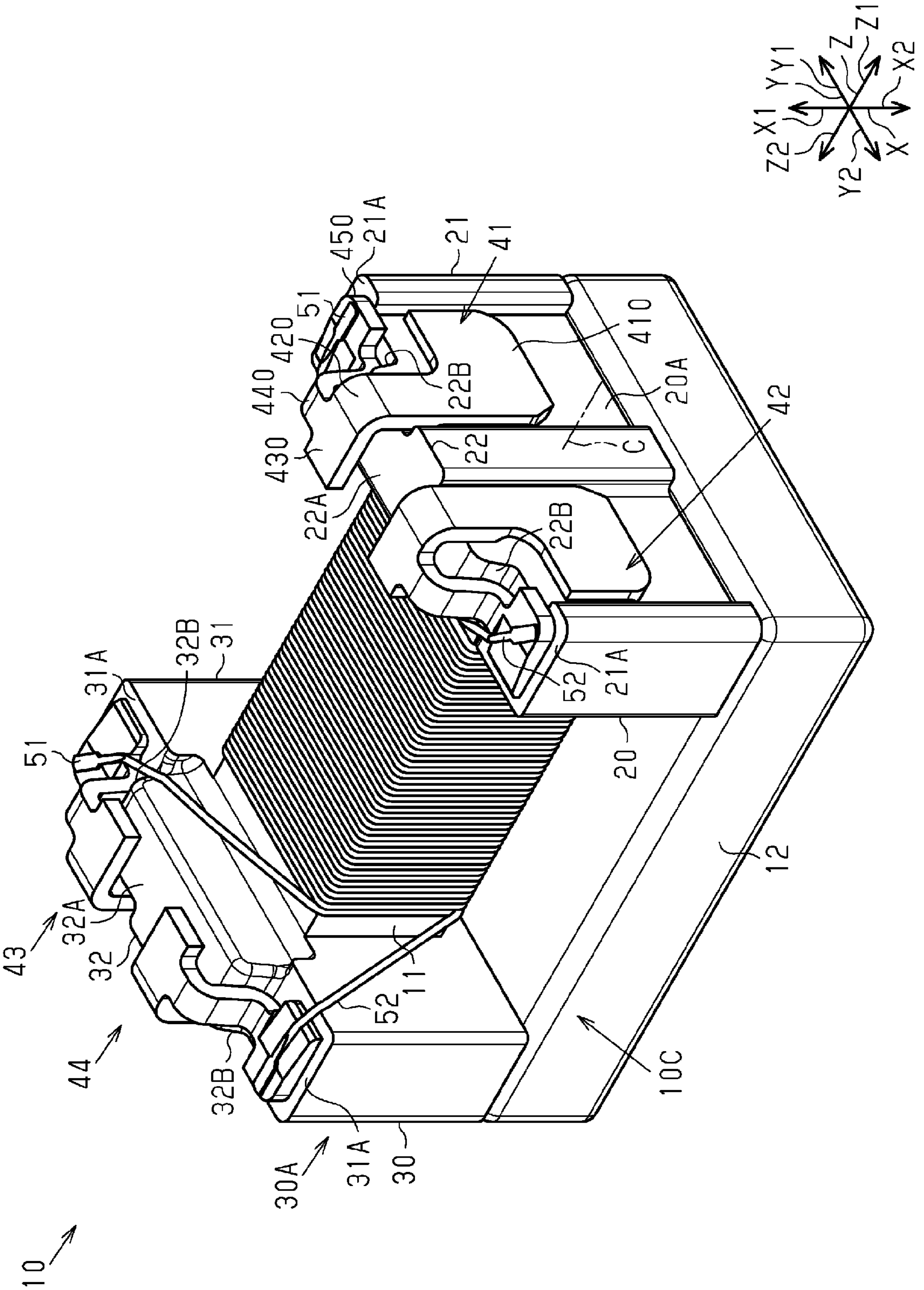
FIG. 1 is a perspective view of a coil component.

As illustrated in FIG. 1, a coil component 10 includes a drum core 10C and a top plate 12.

The drum core 10C includes a winding core portion 11, a first flange portion 20, and a second flange portion 30.

The winding core portion 11 has a quadrangular prism shape. The material of the winding core portion 11 is a non-conductive material. Specifically, the material of the winding core portion 11 can be, for example, alumina, Ni—Zn-based ferrite, resin, a mixture thereof, or the like.

The first flange portion 20 is connected to a first end of the winding core portion 11 in a direction along a central axis C. The second flange portion 30 is connected to a second end of the winding core portion 11 in the direction along the central axis C. The material of the first flange portion 20 and the second flange portion 30 is the same non-conductive material as the winding core portion 11. The first flange portion 20 and the second flange portion 30 are integrally molded with the winding core portion 11.

Here, a specific axis orthogonal to the central axis C is defined as a first axis X. In the present embodiment, the first axis X is parallel to two of the four sides of the winding core portion 11 when viewed in the direction along the central axis C. An axis orthogonal to both the central axis C and the first axis X is defined as a second axis Y. Further, in the present embodiment, an axis parallel to the central axis C is defined as a third axis Z. One of the directions along the first axis X is defined as a first positive direction X1, and a direction opposite to the first positive direction X1 is defined as a first negative direction X2. Similarly, one of the directions along the second axis Y is defined as a second positive direction Y1, and a direction opposite to the second positive direction Y1 is defined as a second negative direction Y2. One of the directions along the third axis Z is defined as a third positive direction Z1, and a direction opposite to the third positive direction Z1 is defined as a third negative direction Z2. In the present embodiment, a direction from the winding core portion 11 toward the first flange portion 20 is defined as a third positive direction Z1, and a direction from the winding core portion 11 toward the second flange portion 30 is defined as a third negative direction Z2.

The first flange portion 20 protrudes outward with respect to the winding core portion 11 in the direction along the first axis X and the direction along the second axis Y. The first flange portion 20 has a symmetrical shape in the direction along the second axis Y. The first flange portion 20 has an outer end surface 20A. The outer end surface 20A is a surface facing the third positive direction Z1 side among the outer surfaces of the first flange portion 20.

The first flange portion 20 includes a main body portion 21 and a protruding portion 22. The main body portion 21 has a quadrangular prism shape that is flat in the direction along the third axis Z as a whole. When viewed in the third negative direction Z2, the edge of the main body portion 21 on the first negative direction X2 side is parallel to the second axis Y. When viewed in the third negative direction Z2, the edge of the main body portion 21 on the first positive direction X1 side is parallel to the second axis Y. Therefore, the main body portion 21 has an upper surface 21A facing the first positive direction X1 side.

The protruding portion 22 protrudes from the upper surface 21A of the main body portion 21 toward the first positive direction X1. The protruding portion 22 has a quadrangular frustum shape in which the dimension in the direction along the second axis Y decreases toward the first positive direction X1. The protruding portion 22 is located substantially at the center of the main body portion 21 in the direction along the second axis Y. The dimension of the protruding portion 22 in the direction along the third axis Z is the same as the dimension of the main body portion 21 in the direction along the third axis Z.

The protruding portion 22 has an upper end surface 22A and two side surfaces 22B. The upper end surface 22A is a surface facing the first positive direction X1 side among the outer surfaces of the protruding portion 22. Each of the side surfaces 22B is a surface connecting the upper end surface 22A and the upper surface 21A of the main body portion 21. One of the side surfaces 22B faces the second positive direction Y1 side. The other one of the side surfaces 22B faces the second negative direction Y2 side. The main body portion 21 and the protruding portion 22 are integrally molded. That is, there is no clear boundary between the main body portion 21 and the protruding portion 22 inside the first flange portion 20.

The second flange portion 30 has a symmetrical shape with respect to the first flange portion 20 in the direction along the third axis Z. That is, the second flange portion 30 protrudes outward with respect to the winding core portion 11 in the direction along the first axis X and the direction along the second axis Y. The second flange portion 30 has an outer end surface 30A. The outer end surface 30A is a surface facing the third negative direction Z2 side among the outer surfaces of the second flange portion 30. The second flange portion 30 includes a main body portion 31 and a protruding portion 32. The configurations of the main body portion 31 and the protruding portion 32 are similar to those of the main body portion 21 and the protruding portion 22 of the first flange portion 20. That is, the main body portion 31 has an upper surface 31A facing the first positive direction X1 side. The protruding portion 32 has an upper end surface 32A and two side surfaces 32B.

In the present embodiment, the maximum dimension of the drum core 10C in the direction along the first axis X is 1.4 mm. The maximum dimension of the drum core 10C in the direction along the second axis Y is 2.5 mm. The maximum dimension of the drum core 10C in the direction along the third axis Z is 3.2 mm.

The top plate 12 has a rectangular plate shape. The top plate 12 is flat in the direction along the first axis X. The long side of the top plate 12 is parallel to the third axis Z. The short side of the top plate 12 is parallel to the second axis Y. The top plate 12 is located on the first negative direction X2 side with respect to the drum core 10C. The top plate 12 is connected to both the surface of the first flange portion 20 facing the first negative direction X2 and the surface of the second flange portion 30 facing the first negative direction X2. That is, the top plate 12 is bridged between the first flange portion 20 and the second flange portion 30. The material of the top plate 12 is the same non-conductive material as that of the drum core 10C.

The coil component 10 includes a first metal terminal 41, a second metal terminal 42, a third metal terminal 43, and a fourth metal terminal 44.

The first metal terminal 41 is attached to the first flange portion 20. The first metal terminal 41 is located on the second positive direction Y1 side with respect to the center of the first flange portion 20 in the direction along the second axis Y. The second metal terminal 42 is attached to the first flange portion 20. The second metal terminal 42 is located on the second negative direction Y2 side with respect to the center of the first flange portion 20 in the direction along the second axis Y. The third metal terminal 43 is attached to the second flange portion 30. The third metal terminal 43 is located on the second positive direction Y1 side with respect to the center of the second flange portion 30 in the direction along the second axis Y. The fourth metal terminal 44 is attached to the second flange portion 30. The fourth metal terminal 44 is located on the second negative direction Y2 side with respect to the center of the second flange portion 30 in the direction along the second axis Y. Details of the first metal terminal 41 to the fourth metal terminal 44 will be described later.

Figure 2:
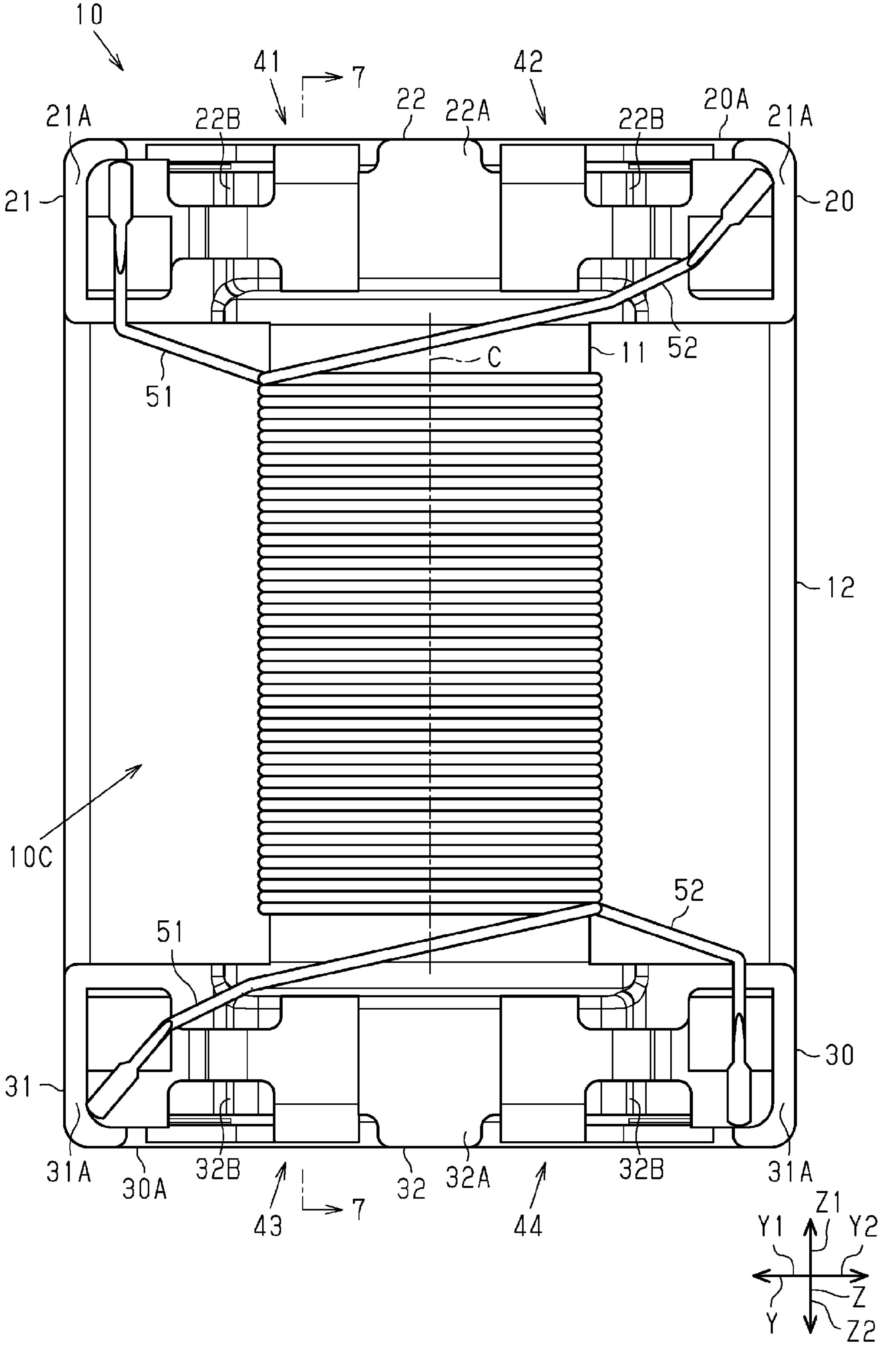
FIG. 2 is a plan view of the coil component.

As illustrated in FIG. 2, the coil component 10 includes a first wire 51 and a second wire 52. Although not illustrated, the first wire 51 includes a copper wire and an insulating film. The insulating film covers the outer surface of the copper wire. The first wire 51 has a substantially circular shape in a section orthogonal to the direction in which the first wire 51 extends. An outer diameter L1 of the first wire 51 is about 50 μm.

A first connection end of the first wire 51 is joined to the first metal terminal 41 by thermocompression bonding. The first wire 51 extends from the first metal terminal 41 toward the ridgeline of the winding core portion 11 on the first negative direction X2 side and the second positive direction Y1 side. When viewed in the third negative direction Z2, the first wire 51 is wound around the winding core portion 11 so as to travel clockwise as it goes toward the third negative direction Z2. A second connection end of the first wire 51 opposite to the first connection end extends toward the third metal terminal 43 from the ridgeline of the winding core portion 11 on the first positive direction X1 side and the second negative direction Y2 side. The second connection end of the first wire 51 is joined to the third metal terminal 43 by thermocompression bonding.

The thermocompression bonding is a method of sandwiching a wire between a metal terminal and a heated jig, and fixing the wire to the metal terminal while melting the wire. As a result of this fixing method, the insulating film is peeled off in the vicinity of the joining portion with the metal terminal in the wire, and the copper wire is exposed.

The second wire 52 has the same configuration as the first wire 51. That is, the second wire 52 includes a copper wire and an insulating film. An outer diameter L1 of the second wire 52 is about 50 μm.

A first connection end of the second wire 52 is joined to the second metal terminal 42 by thermocompression bonding. The second wire 52 extends from the second metal terminal 42 toward the ridgeline of the winding core portion 11 on the first positive direction X1 side and the second positive direction Y1 side. When viewed in the third negative direction Z2, the second wire 52 is wound around the winding core portion 11 so as to travel clockwise as it goes toward the third negative direction Z2. A second connection end of the second wire 52 opposite to the first connection end extends toward the fourth metal terminal 44 from the ridgeline of the winding core portion 11 on the first negative direction X2 side and the second negative direction Y2 side. The second connection end of the second wire 52 is joined the fourth metal terminal 44 by thermocompression bonding.

<First Metal Terminal>

Figure 6:
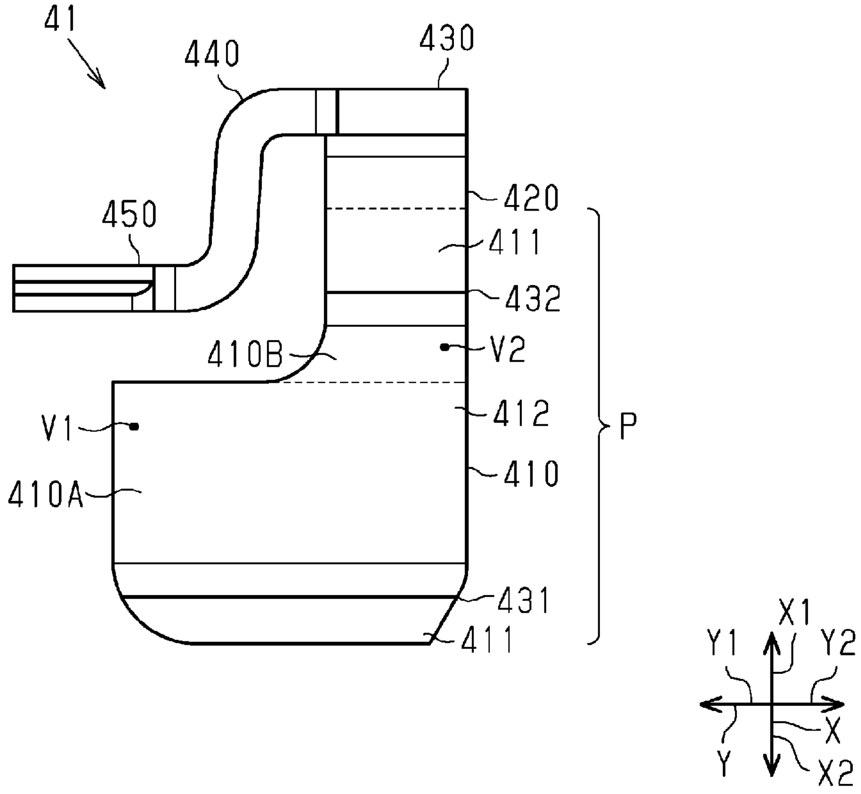
FIG. 6 is a front view of the first metal terminal in the coil component.

As illustrated in FIG. 6, the first metal terminal 41 includes a bonding portion 410, a coupling portion 420, a mounting portion 430, an extending portion 440, and a joining portion 450. The bonding portion 410, the coupling portion 420, the mounting portion 430, the extending portion 440, and the joining portion 450 are integrally molded. That is, there is no clear boundary between these members inside the first metal terminal 41.

In the following description, among the directions along the central axis C, a direction from each metal terminal toward the winding core portion 11 may be referred to as an inward direction, and a direction opposite to the inward direction may be referred to as an outward direction. For example, the inward direction from the first metal terminal 41 toward the winding core portion 11 coincides with the third negative direction Z2. The outward direction with reference to the first metal terminal 41 coincides with the third positive direction Z1.

<Bonding Portion>

Figure 7:
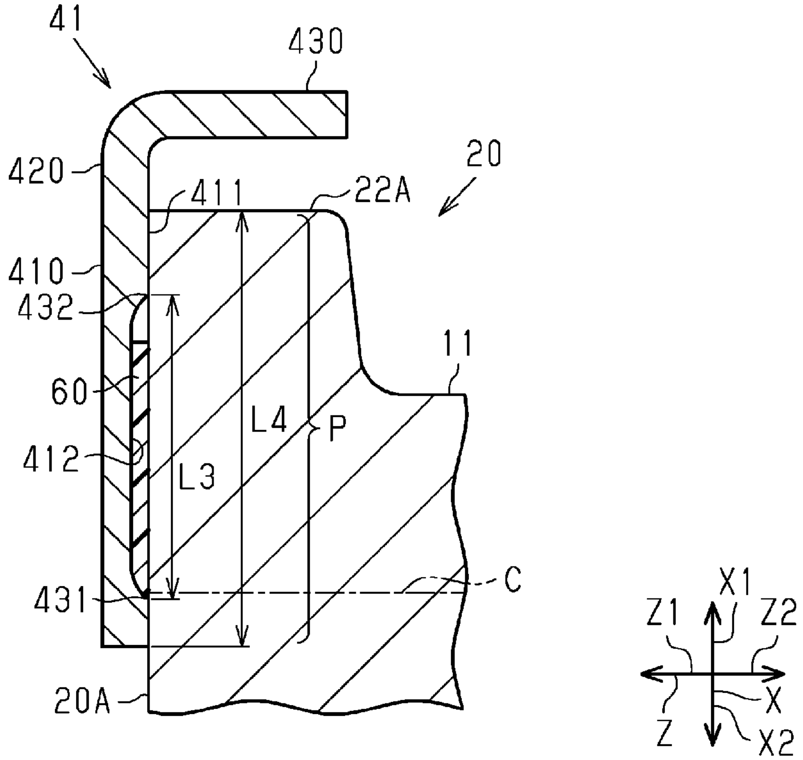
FIG. 7 is a view illustrating a part of an end view taken along line 7-7 in FIG. 2.

As illustrated in FIG. 1, the bonding portion 410 has a substantially plate shape. As illustrated in FIG. 7, the bonding portion 410 is fixed to the outer end surface 20A of the first flange portion 20 with an adhesive 60 interposed therebetween. That is, the bonding portion 410 is joined to a surface facing the third positive direction Z1 among the outer surfaces of the first flange portion 20. As described above, the bonding portion 410 is a portion of the first metal terminal 41 facing the outer end surface 20A of the first flange portion 20 from the third positive direction Z1 side.

As illustrated in FIG. 6, the bonding portion 410 has a relative surface 411 and a recess 412. As illustrated in FIG. 7, the relative surface 411 is a surface facing the outer end surface 20A from the third positive direction Z1 side except for the recess 412. That is, the relative surface 411 of the first metal terminal 41 is a surface facing the third negative direction Z2.

As illustrated in FIG. 6, the bonding portion 410 includes a wide portion 410A and a narrow portion 410B. The wide portion 410A is a part including an end of the bonding portion 410 in the first negative direction X2. The wide portion 410A has a substantially rectangular shape in which two adjacent corners on the first negative direction X2 side are chamfered when viewed in the third positive direction Z1. The dimension of the wide portion 410A in the direction along the second axis Y is substantially constant except for the chamfered portions. The wide portion 410A includes a portion having the largest dimension in the direction along the second axis Y in the relative surface 411 and the recess 412.

The narrow portion 410B is adjacent to the wide portion 410A on the first positive direction X1 side. Specifically, the narrow portion 410B extends in the first positive direction X1 from an end of the wide portion 410A in the second negative direction Y2. In FIG. 6, a boundary between the narrow portion 410B and the wide portion 410A is virtually indicated by a broken line. The narrow portion 410B has a smaller dimension in the direction along the second axis Y than the wide portion 410A. The dimension of the narrow portion 410B in the direction along the second axis Y is ½ or less of the dimension of the wide portion 410A in the direction along the second axis Y. The dimension of the narrow portion 410B in the direction along the second axis Y is substantially constant except for a coupling portion with the wide portion 410A.

As illustrated in FIG. 7, the recess 412 is recessed with respect to the relative surface 411. The adhesive 60 is accommodated in the recess 412. However, the adhesive 60 is not accommodated in a part of the recess 412 including an end in the first positive direction X1.

As illustrated in FIG. 6, the recess 412 is located across the wide portion 410A and the narrow portion 410B. The end 431 of the recess 412 on the first negative direction X2 side is located on the first positive direction X1 side with respect to the end of the bonding portion 410 in the first negative direction X2. That is, the recess 412 is not opened toward the end of the bonding portion 410 in the first negative direction X2. As illustrated in FIG. 7, the end 431 of the recess 412 on the first negative direction X2 side is located on the first negative direction X2 side as viewed from the central axis C.

An end 432 of the recess 412 on the first positive direction X1 side is located on the first negative direction X2 side with respect to the end of the bonding portion 410 in the first positive direction X1. That is, the end 432 of the recess 412 on the first positive direction X1 side is located on the first negative direction X2 side as viewed from the upper end surface 22A of the first flange portion 20. As illustrated in FIG. 7, the end 432 of the recess 412 on the first positive direction X1 side is located on the first positive direction X1 side as viewed from the end of the winding core portion 11 on the first positive direction X1 side.

As illustrated in FIG. 6, the recess 412 of the narrow portion 410B extends over the entire narrow portion 410B in the direction along the second axis Y. Further, the recess 412 of the wide portion 410A extends over the entire wide portion 410A in the direction along the second axis Y. That is, the maximum dimension of the recess 412 located in the wide portion 410A in the direction along the second axis Y is larger than the maximum dimension of the narrow portion 410B in the direction along the second axis Y.

The edge of the recess 412 on the first negative direction X2 side is substantially parallel to the second axis Y. The edge of the recess 412 on the first positive direction X1 side is substantially parallel to the second axis Y. The distance from the edge of the recess 412 on the first negative direction X2 side to the boundary line between the wide portion 410A and the narrow portion 410B is larger than the distance from the boundary line between the wide portion 410A and the narrow portion 410B to the edge of the recess 412 on the first positive direction X1 side. That is, the area of the portion of the recess 412 located in the wide portion 410A is larger than the area of the portion of the recess 412 located in the narrow portion 410B.

The dimension of the recess 412 in the direction along the third axis Z, that is, the depth of the recess 412 is substantially constant except for the edge of the recess 412. Therefore, reflecting the above-described difference in area, the volume V1 of the portion of the recess 412 located in the wide portion 410A is larger than the volume V2 of the portion of the recess 412 located in the narrow portion 410B.

As illustrated in FIG. 7, a region where the relative surface 411 and the recess 412 are combined, that is, a region of the first metal terminal 41 facing the outer end surface 20A of the first flange portion 20 is defined as a facing region P. At this time, as illustrated in FIG. 6, when viewed in the direction along the central axis C, the area of the region of the recess 412 facing the outer end surface 20A of the first flange portion 20 is ½ or more of the facing region P. That is, the area of the region of the recess 412 facing the outer end surface 20A of the first flange portion 20 is equal to or larger than the area of the relative surface 411. Further, as illustrated in FIG. 7, the maximum dimension L3 of the recess 412 in the direction along the first axis X is ½ or more of the maximum dimension L4 of the facing region P in the direction along the first axis X. Note that "when viewed in the direction along the central axis C" is not limited to those that can be directly visually recognized, and includes a case where it is viewed while being transmitted as described above.

<Coupling Portion>

As illustrated in FIG. 7, the coupling portion 420 is connected to an end of the bonding portion 410 in the first positive direction X1. In FIG. 6, the boundary between the coupling portion 420 and the bonding portion 410 is virtually indicated by a broken line. The coupling portion 420 extends from the bonding portion 410 in the first positive direction X1. That is, the coupling portion 420 protrudes from the first flange portion 20 in the direction along the first axis X when viewed in the direction along the third axis Z. Specifically, the coupling portion 420 protrudes toward the first positive direction X1 side with respect to the upper end surface 22A of the first flange portion 20. The coupling portion 420 is bent by about 90 degrees on the way. An end of the coupling portion 420 opposite to the bonding portion 410 faces the third negative direction Z2.

<Mounting Portion>

Figure 4:
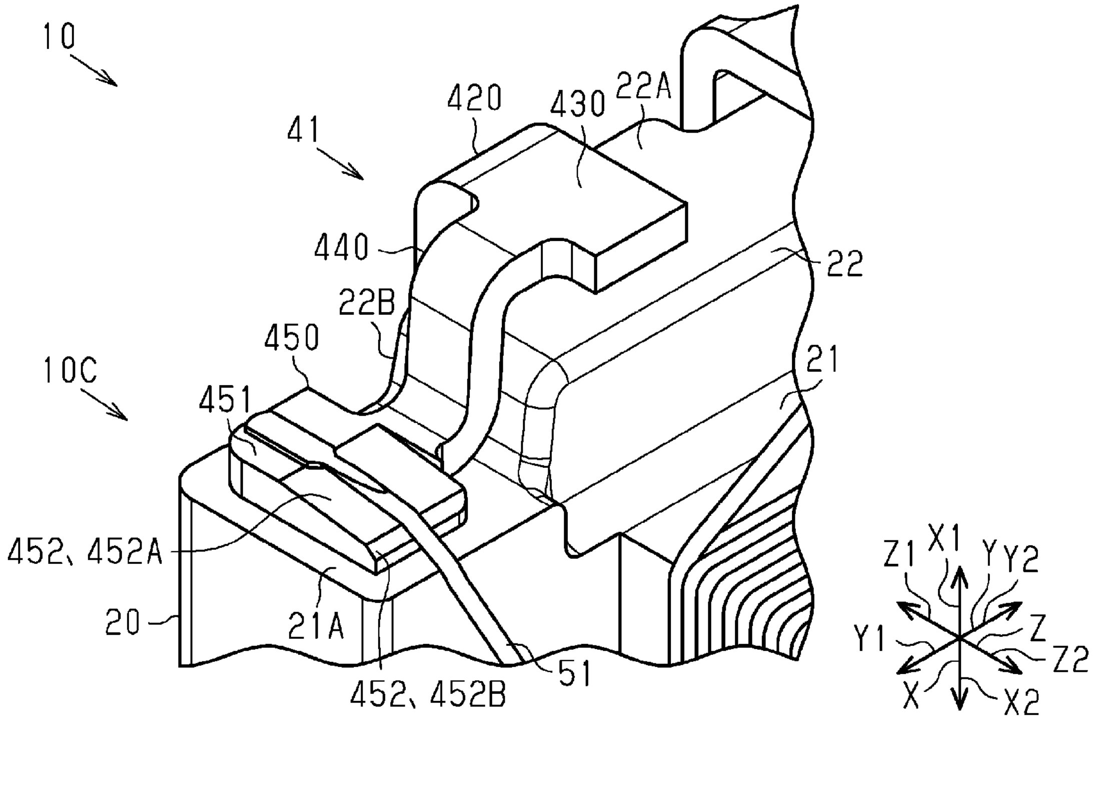
FIG. 4 is a perspective view of the vicinity of the first metal terminal in the coil component.

As illustrated in FIG. 4, the mounting portion 430 is connected to an end of the coupling portion 420 opposite to the bonding portion 410. The mounting portion 430 has a flat plate shape. The main surface of the mounting portion 430 is orthogonal to the first axis X. The mounting portion 430 is a portion of the first metal terminal 41 that is located closest to the first positive direction X1 side. The mounting portion 430 is separated from the upper end surface 22A of the first flange portion 20 on the first positive direction X1 side. That is, there is a gap between the mounting portion 430 and the upper end surface 22A. The mounting portion 430 is separated from any outer surface of the drum core 10C including the upper end surface 22A. The mounting portion 430 is a portion facing a substrate when the coil component 10 is mounted on the substrate.

Figure 5:
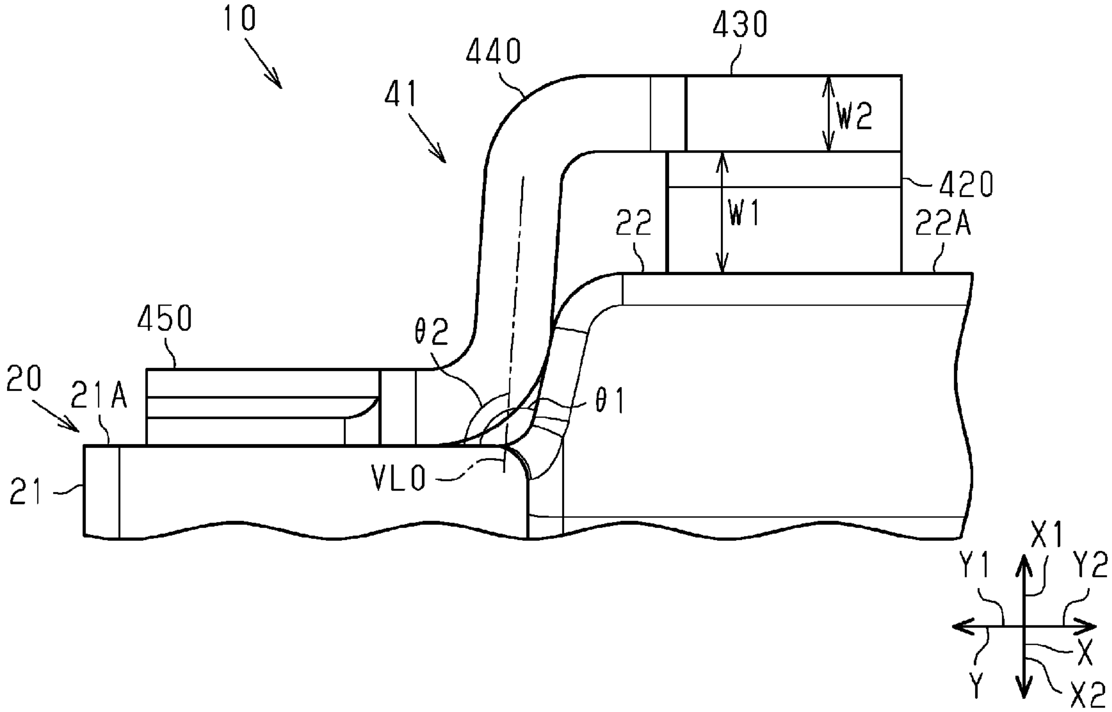
FIG. 5 is a front view of the vicinity of the first metal terminal in the coil component.

As illustrated in FIG. 5, the shortest distance W1 from the mounting portion 430 to the upper end surface 22A in the direction along the first axis X is larger than the minimum dimension W2 of the mounting portion 430 in the direction along the first axis X. In the present embodiment, the dimension of the mounting portion 430 in the direction along the first axis X is the plate thickness of the first metal terminal 41. The plate thickness is substantially constant. The plate thickness of the first metal terminal 41 is substantially constant at the bonding portion 410 excluding the recess 412, the coupling portion 420, the mounting portion 430, and the extending portion 440.

<Extending Portion>

As illustrated in FIG. 4, the extending portion 440 is connected to an end of the mounting portion 430 on the second positive direction Y1 side. The extending portion 440 extends substantially obliquely from the mounting portion 430 toward the second positive direction Y1 side and the first negative direction X2 side. The dimension of the extending portion 440 in the direction along the third axis Z, that is, the width dimension of the extending portion 440 is substantially constant. As illustrated in FIG. 5, when viewed in the direction along the third axis Z, the extending portion 440 extends so as to approach the side surface 22B of the protruding portion 22 facing the second positive direction Y1 side as it goes in the first negative direction X2. The surface of the extending portion 440 facing the second negative direction Y2 is in line contact with the side surface 22B of the protruding portion 22. When the extending portion 440 does not have a surface parallel to the side surface 22B, the extending portion 440 is in line contact with the side surface 22B.

Specifically, as illustrated in FIG. 5, among the angles formed by the side surface 22B and the upper surface 21A when viewed in the third positive direction Z1, an angle on the second positive direction Y1 side and the first positive direction X1 side is defined as a first angle θ1. The extending portion 440 has a portion extending linearly. Among the angles formed by the imaginary line VL0 passing through the center of the linearly extending portion and the upper surface 21A, the angle on the second positive direction Y1 side and the first positive direction X1 side is defined as a second angle θ2. At this time, the second angle θ2 is smaller than the first angle θ1.

<Joining Portion>

Figure 3:
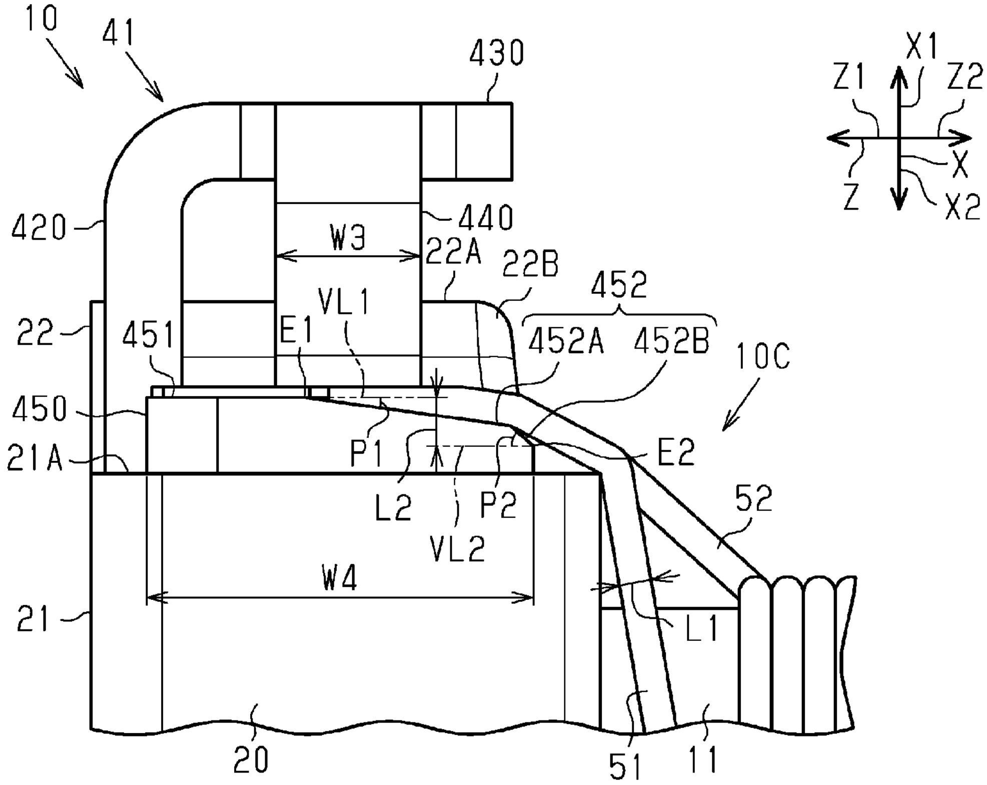
FIG. 3 is a side view of the vicinity of a first metal terminal in the coil component.

As illustrated in FIG. 4, the joining portion 450 is connected to an end of the extending portion 440 on the first negative direction X2 side. The joining portion 450 has a substantially plate shape. The joining portion 450 has a substantially rectangular shape elongated in the third axis Z direction when viewed in the direction along the first axis X. As illustrated in FIG. 3, the maximum dimension W4 of the joining portion 450 in the direction along the third axis Z is larger than the maximum dimension W3 of the extending portion 440 in the direction along the third axis Z, that is, the width dimension of the extending portion 440.

As illustrated in FIG. 4, the joining portion 450 faces the upper surface 21A of the first flange portion 20 from the first positive direction X1 side. A surface of the joining portion 450 facing the first negative direction X2 is in contact with the upper surface 21A. On the other hand, the surface of the joining portion 450 facing the first negative direction X2 is not fixed to the upper surface 21A. That is, the adhesive 60 and the like are not interposed between the surface of the joining portion 450 facing the first negative direction X2 and the upper surface 21A.

When viewed in the direction along the first axis X, the joining portion 450 does not protrude from the upper surface 21A of the first flange portion 20 in the third negative direction Z2. That is, the end of the upper surface 21A of the first flange portion 20 on the third negative direction Z2 side is located on the third negative direction Z2 side with respect to the end of the joining portion 450 on the third negative direction Z2 side.

The joining portion 450 has a horizontal surface 451 and an inclined surface 452. The horizontal surface 451 faces the first positive direction X1. The horizontal surface 451 is a surface located closest to the third positive direction Z1 side among the outer surfaces of the joining portion 450. When viewed in the direction along the first axis X, the horizontal surface 451 has a substantially rectangular shape.

The inclined surface 452 further has a first inclined surface 452A and a second inclined surface 452B. The first inclined surface 452A is a flat surface facing the first positive direction X1 side and the third negative direction Z2 side. The horizontal surface 451 is adjacent to the first inclined surface 452A on the third positive direction Z1 side. The first inclined surface 452A is located in the first negative direction X2 toward the third negative direction Z2.

The second inclined surface 452B is a flat surface facing the first positive direction X1 side and the third negative direction Z2 side. The second inclined surface 452B is adjacent to the first inclined surface 452A on the third negative direction Z2 side. The second inclined surface 452B is located in the first negative direction X2 toward the third negative direction Z2. The second inclined surface 452B reaches an end of the joining portion 450 on the third negative direction Z2 side.

As illustrated in FIG. 3, when viewed in the direction along the second axis Y, the virtual straight line VL1 passing through the end E1 of the first inclined surface 452A on the third positive direction Z1 side and parallel to the central axis C is drawn. An acute angle formed by the first inclined surface 452A and the virtual straight line VL1 is defined as an angle P1. When viewed in the direction along the second axis Y, the virtual straight line VL2 passing through the end E2 of the second inclined surface 452B on the third negative direction Z2 side and parallel to the central axis C is drawn. The acute angle formed by the second inclined surface 452B and the virtual straight line VL2 is defined as an angle P2. At this time, the angle P2 is larger than the angle P1.

Both the first inclined surface 452A and the second inclined surface 452B are flat surfaces. Therefore, the tangent at the end E1 of the first inclined surface 452A on the third positive direction Z1 side is a line extending on the first inclined surface 452A. Similarly, the tangent at the end E2 of the second inclined surface 452B on the third negative direction Z2 side is a line extending on the second inclined surface 452B.

In addition, the distance L2 in the direction along the first axis X from the end E1 of the inclined surface 452 in the third positive direction Z1 to the end E2 of the inclined surface 452 in the third negative direction Z2 is about 70 μm. That is, the distance L2 in the direction along the first axis X from the end E1 of the inclined surface 452 in the third positive direction Z1 to the end E2 of the inclined surface 452 in the third negative direction Z2 is larger than the outer diameter L1 of the first wire 51.

<Second Metal Terminal 42 to Fourth Metal Terminal 44>

As illustrated in FIG. 1, the second metal terminal 42 has a shape inverted in the direction along the second axis Y with respect to the first metal terminal 41. Similarly to the first metal terminal 41, the second metal terminal 42 is joined to the outer end surface 20A of the first flange portion 20 at the bonding portion 410. The third metal terminal 43 has the same shape as the second metal terminal 42. The third metal terminal 43 is joined to the outer end surface 30A of the second flange portion 30 at the bonding portion 410. The fourth metal terminal 44 has the same shape as the first metal terminal 41. The fourth metal terminal 44 is joined to the outer end surface 30A of the second flange portion 30 at the bonding portion 410.

Actions of Present Embodiment

When the first wire 51 is joined to the joining portion 450, the first connection end of the first wire 51 is disposed on the horizontal surface 451, and a jig is pressed parallel to the horizontal surface 451. The jig is a heater chip. The jig is in contact with the first wire 51 on the horizontal surface 451 and a part of the first wire 51 on the third positive direction Z1 side on the first inclined surface 452A. When the first wire 51 comes into contact with the jig, the insulating film in the first wire 51 melts. That is, in the entire first wire 51 on the horizontal surface 451 and a part of the first wire 51 on the first inclined surface 452A, the insulating film is peeled off, and the copper wire is exposed. Further, at the time of thermocompression bonding, the first wire 51 on the horizontal surface 451 is crushed and flattened by the load of the jig. Similarly, a part of the first wire 51 on the third positive direction Z1 side on the first inclined surface 452A in contact with the jig is flat. At the time of the thermocompression bonding, a part of the first wire 51 on the first inclined surface 452A and the first wire 51 on the second inclined surface 452B that do not come into contact with the jig are in a state where the insulating film remains. In addition, since the first wire 51 on the second inclined surface 452B does not come into contact with the jig, it is not flat.

Effects of Present Embodiment

The effects of the present embodiment will be described. Hereinafter, the effects of the first wire 51 and the first metal terminal 41 will be described as a representative, but the same effects are obtained at a joining portion between each wire and each metal terminal.

(1) According to the above embodiment, the inclined surface 452 of the first metal terminal 41 is gradually inclined stepwise as it goes toward the inward direction. Specifically, the angle P2 in the inclined surface 452 is larger than the angle P1. With such an inclined surface 452, when the first wire 51 is placed along the inclined surface 452, the first wire 51 is bent in two steps. That is, the first wire 51 is not rapidly bent at a specific portion. While the first wire 51 of the first metal terminal 41 is not greatly bent, the portion of the first wire 51 not on the first metal terminal 41 is rapidly bent from the upper surface 21A toward the winding core portion 11. By suppressing the bending of the first wire 51 on the first metal terminal 41 that is thermocompression-bonded to be uncovered as in the above configuration, the disconnection of the first wire 51 can be prevented.

(2) According to the above embodiment, when the first wire 51 is joined to the joining portion 450 of the first metal terminal 41 by crimping, the first wire 51 is not strongly crushed at the end E2 of the second inclined surface 452B on the inward direction side. Therefore, after the first wire 51 is joined, the first wire 51 does not become excessively thin on the end E2 of the second inclined surface 452B on the inward direction side. Therefore, if the first wire 51 is bent at the end E2 of the second inclined surface 452B on the inward direction side, the first wire 51 can be prevented from being disconnected at the portion.

(3) According to the above embodiment, for example, by pressing the jig parallel to the horizontal surface 451 to join the first wire 51, the first wire 51 extends on the horizontal surface 451 with substantially the same thickness. As a result, since the joining range between the first wire 51 and the first metal terminal 41 can be widened, the strength required as the joining strength of the first wire 51 can be secured.

(4) According to the above embodiment, the end of the upper surface 21A of the first flange portion 20 in the third negative direction Z2 is located on the third negative direction Z2 side with respect to the end of the joining portion 450 in the third negative direction Z2. Therefore, as illustrated in FIG. 3, the first wire 51 can be in contact with the end of the upper surface 21A of the first flange portion 20 in the inward direction. When the first wire 51 comes into contact with the end of the upper surface 21A in the inward direction, the first wire 51 is also bent at the contact portion. That is, according to the above configuration, the number of portions where the first wire 51 can be bent can be increased by one. When the number of portions where the first wire 51 can be bent increases, the bending angle of the first wire 51 can be dispersed at a plurality of portions, so that the first wire 51 can be prevented from being rapidly bent at a specific portion.

(5) In the above embodiment, when the coil component 10 is attached to the substrate, the mounting portion 430 comes into contact with the substrate. According to the above embodiment, the maximum dimension W3 of the extending portion 440 in the direction along the third axis Z is smaller than the maximum dimension W4 of the joining portion 450 in the direction along the third axis Z. Therefore, for example, impact when the mounting portion 430 is mounted on a substrate or the like can be absorbed by deformation of the extending portion 440. Therefore, the impact transmitted from the mounting portion 430 to the joining portion 450 can be weakened. Therefore, it is possible to suppress the first wire 51 from being detached from the joining portion 450 by the impact from the mounting portion 430.

Modification

The present embodiment can be modified as follows. The present embodiment and the following modifications can be implemented in combination with each other within a range not technically contradictory. A modification common to the first metal terminal 41 to the fourth metal terminal 44 will be described only for the first metal terminal 41 as a representative.

In the above embodiment, the configuration of the coil component 10 is not limited. For example, the top plate 12 can be omitted from the coil component 10. The shape of the first flange portion 20 is not limited to the shape of the above embodiment. For example, the protruding portion 22 can be omitted from the first flange portion 20.

In the above embodiment, the second wire 52 may be omitted from the coil component 10. For example, when the coil component 10 includes only the first wire 51, one metal terminal may be attached to each flange portion.

In the above embodiment, the winding core portion 11 may not have a quadrangular prism shape. For example, the sectional shape of the winding core portion 11 may be a circular shape, an elliptical shape, or a polygonal shape other than a quadrangular shape.

In the above embodiment, the shape of the first metal terminal 41 is not limited to the example of the above embodiment. The first metal terminal 41 may have the joining portion 450 facing the upper surface 21A of the first flange portion 20 facing the first positive direction X1.

In the above embodiment, the joining portion 450 may be separated from the upper surface 21A. In addition, the adhesive 60 may be accommodated between the joining portion 450 and the upper surface 21A.

In the above embodiment, there may be no clear boundary between the first inclined surface 452A and the second inclined surface 452B in the joining portion 450. That is, the inclined surface 452 may be configured such that the inclination angle changes gently. Here, an acute angle formed by the inclined surface 452 at the end E1 of the inclined surface 452 on the third positive direction Z1 side and the virtual straight line VL1 is defined as the angle P1. An acute angle formed by the inclined surface 452 at the end E2 of the inclined surface 452 on the third negative direction Z2 side and the virtual straight line VL2 is defined as the angle P2. Also in this case, the angle P2 is larger than the angle P1. Note that the inclined surface 452 may include only one inclined surface. In this case, a part including the inner end E2 of the inclined surface 452 may be a curved surface, and as a result, the angle P2 may be larger than the angle P1.

Figure 8:
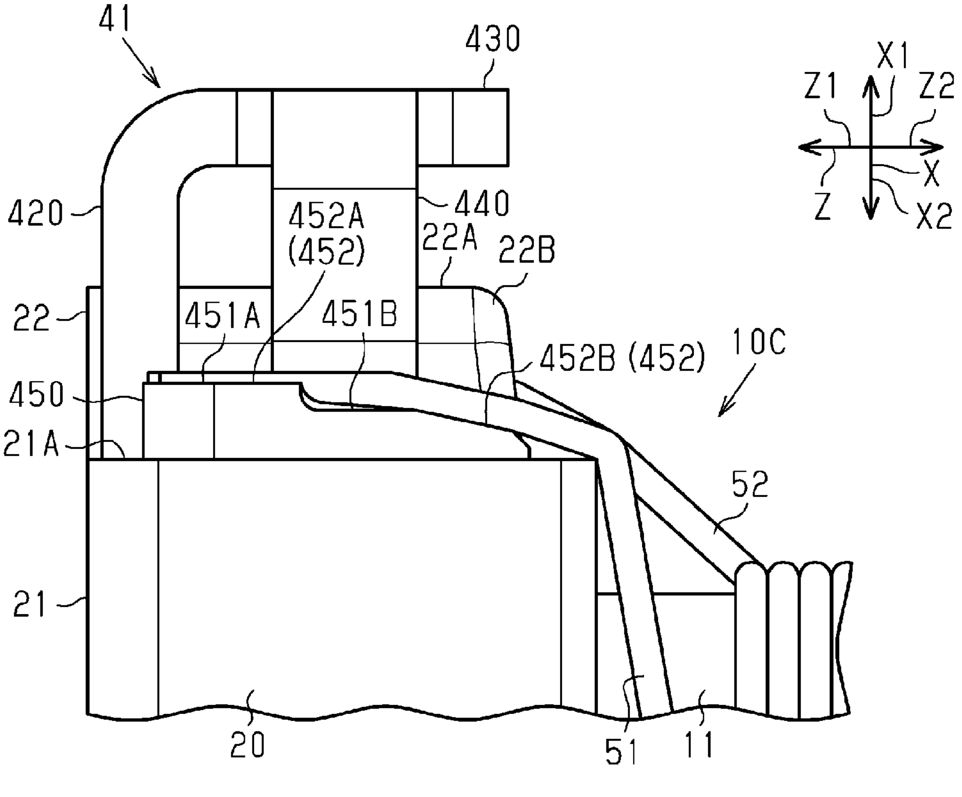
FIG. 8 is a view illustrating a modification of a joining portion of a coil component.

In the above embodiment, the configuration of the joining portion 450 is not limited to the example of the above embodiment. For example, in the example illustrated in FIG. 8, the joining portion 450 has a first horizontal surface 451A and a second horizontal surface 451B. The first horizontal surface 451A is a surface located closest to the third positive direction Z1 side among the outer surfaces of the joining portion 450. The first horizontal surface 451A faces the first positive direction X1. When viewed in the direction along the first axis X, the first horizontal surface 451A has a substantially rectangular shape. The second horizontal surface 451B is adjacent to the first horizontal surface 451A on the third negative direction Z2 side. The second horizontal surface 451B is located on the first negative direction X2 side with respect to the first horizontal surface 451A. As a result, a step is formed between the first horizontal surface 451A and the second horizontal surface 451B. The first wire 51 is thermocompression-bonded on the first horizontal surface 451A. In the example illustrated in FIG. 8, the joining portion 450 has the inclined surface 452 including the first inclined surface 452A and the second inclined surface 452B as in the above embodiment. According to this configuration, the first wire 51 is connected to the second horizontal surface 451B and the inclined surface 452 on the first positive direction X1 side. Therefore, when the first wire 51 is thermocompression-bonded, the first wire 51 on the second horizontal surface 451B and the inclined surface 452 is hardly affected by thermocompression bonding. Therefore, at the end E2 of the second inclined surface 452B on the inward direction side, the first wire 51 is not strongly crushed, and the first wire 51 is hardly disconnected.

In the above embodiment, the horizontal surface 451 can be omitted from the joining portion 450. That is, the joining portion 450 may include only the inclined surface 452. In this case, the first wire 51 is preferably joined to the inclined surface 452 at a portion of the inclined surface 452 closer to the outward direction. The joining portion 450 may further has an inclined surface in addition to the first inclined surface 452A and the second inclined surface 452B.

In the above embodiment, the end of the upper surface 21A on the third negative direction Z2 side may be located on the third positive direction Z1 side with respect to the end of the joining portion 450 on the third negative direction Z2 side. That is, the joining portion 450 may protrude from the first flange portion 20.

In the above embodiment, the distance L2 in the direction along the first axis X from the end E1 of the inclined surface 452 in the third positive direction Z1 to the end E2 of the inclined surface 452 in the third negative direction Z2 may be smaller than or equal to the outer diameter L1 of the first wire 51.

In the above embodiment, the maximum dimension W3 of the extending portion 440 in the direction along the third axis Z may be larger than or the same as the maximum dimension W4 of the joining portion 450 in the direction along the third axis Z.

In the above embodiment, the recess 412 can be omitted in the coil component 10. In this case, the first metal terminal 41 is attached to the first flange portion 20 with the adhesive 60 interposed therebetween at any place.

In the above embodiment, when viewed in the direction along the third axis Z, the area of the region of the recess 412 facing the outer end surface 20A may be smaller than or equal to the area of the relative surface 411.

In the above embodiment, the position of the recess 412 is not limited to the example of the above embodiment. That is, the end 432 of the recess 412 on the first positive direction X1 side may be located on the first positive direction X1 side with respect to the end of the bonding portion 410 in the first positive direction X1. The end 431 of the recess 412 on the first negative direction X2 side may be located on the first positive direction X1 side as viewed from the central axis C.

In the above embodiment, the dimension of the bonding portion 410 in the direction along the second axis Y may be constant. That is, the bonding portion 410 may not be roughly divided into the wide portion 410A and the narrow portion 410B.

In the above embodiment, the recess 412 may not extend over the entire wide portion 410A in the direction along the second axis Y. Similarly, the recess 412 may not extend over the entire narrow portion 410B in the direction along the second axis Y. The volume V1 of the portion of the recess 412 located in the wide portion 410A may be smaller than or equal to the volume V2 of the portion of the recess 412 located in the narrow portion 410B.

In the above embodiment, the maximum dimension L3 of the recess 412 in the direction along the first axis X may be smaller than or equal to ½ of the maximum dimension L4 of the facing region P.

In the above embodiment, the adhesive 60 may be accommodated up to the end 432 of the recess 412 in the first positive direction X1. Further, the adhesive 60 may reach the relative surface 411 and the coupling portion 420.

In the above embodiment, the mounting portion 430 may be in contact with the upper end surface 22A of the protruding portion 22. That is, the mounting portion 430 may be in contact with the outer surface of the drum core 10C. In addition, the adhesive 60 may be applied between the mounting portion 430 and the protruding portion 22.

In the above embodiment, the shortest distance W1 from the mounting portion 430 to the upper end surface 22A may be smaller than or equal to the minimum dimension W2 of the mounting portion 430 in the direction along the first axis X.

In the above embodiment, the extending portion 440 may not be in contact with the side surface 22B. The extending portion 440 may extend away from the side surface 22B as it goes toward the first negative direction X2.

Technical ideas that can be derived from the above embodiments and modifications will be described below.

[1] A coil component including a drum core including a columnar winding core portion, a first flange portion connected to a first end of the winding core portion in a direction along a central axis of the winding core portion, and a second flange portion connected to a second end of the winding core portion opposite to the first end; a first metal terminal attached to the first flange portion; and a wire wound around the winding core portion and having a first connection end joined to the first metal terminal. The first flange portion protrudes outward with respect to the winding core portion in a first positive direction orthogonal to the central axis. The first metal terminal includes a joining portion facing a surface of the first flange portion facing the first positive direction. A first connection end of the wire is joined to a surface of the joining portion facing a side of the first positive direction. Also, when a direction from the first metal terminal toward the winding core portion in a direction along the central axis is defined as an inward direction, a direction opposite to the inward direction is defined as an outward direction, and a direction opposite to the first positive direction is defined as a first negative direction, the joining portion has an inclined surface located in the first negative direction toward the inward direction on a surface facing the side of the first positive direction, and the inclined surface reaches an end of the joining portion on a side of the inward direction. Also, when viewed in a direction orthogonal to both the first positive direction and the inward direction, an acute angle formed by a virtual straight line parallel to the central axis and a tangent at an end of the inclined surface in the inward direction is larger than an acute angle formed by the virtual straight line and a tangent at an end of the inclined surface in the outward direction.

[2] The coil component according to [1], in which the inclined surface includes a first inclined surface and a second inclined surface adjacent to the first inclined surface on the side of the inward direction.

[3] The coil component according to [1] or [2], in which a distance in the first positive direction from the end of the inclined surface in the inward direction to the end of the inclined surface in the outward direction is larger than an outer diameter of the wire.

[4] The coil component according to any one of [1] to [3], in which the joining portion includes a horizontal surface adjacent to the inclined surface in the outward direction and orthogonal to the first positive direction, and in which the wire is joined to the horizontal surface.

[5] The coil component according to any one of [1] to [4], in which the first flange portion is located on a side of the first negative direction with respect to the joining portion and has an upper surface facing the joining portion, and in which an end of the upper surface in the inward direction is located in the inward direction with respect to an end of the joining portion in the inward direction.

[6] The coil component according to any one of [1] to [5], in which the first metal terminal includes a mounting portion located closest to the side of the first positive direction in the first metal terminal, and an extending portion extending from the joining portion toward the side of the first positive direction and connected to the mounting portion. A maximum dimension of the extending portion in the direction along the central axis is smaller than a maximum dimension of the joining portion in the direction along the central axis.

[7] The coil component according to any one of [1] to [6], further includes a second metal terminal attached to the first flange portion; a third metal terminal attached to the second flange portion; a fourth metal terminal attached to the second flange portion; and a second wire wound around the winding core portion and having a first connection end joined to the second metal terminal. When the wire is defined as a first wire when a specific axis orthogonal to the central axis is defined as a first axis, and an axis orthogonal to both the central axis and the first axis is defined as a second axis, and one of directions along the second axis is a second positive direction and a direction opposite to the second positive direction is a second negative direction, the second flange portion protrudes outward with respect to the winding core portion in the first positive direction orthogonal to the central axis, the first metal terminal is located on a side of the second positive direction with respect to a center of the first flange portion in a direction along the second axis, the second metal terminal is located on a side of the second negative direction with respect to a center of the first flange portion in the direction along the second axis, the third metal terminal is located on the side of the second positive direction with respect to a center of the second flange portion in the direction along the second axis, the fourth metal terminal is located on the side of the second negative direction with respect to the center of the second flange portion in the direction along the second axis, a second connection end of the first wire opposite to the first connection end is connected to the third metal terminal, and a second connection end of the second wire opposite to the first connection end is connected to the fourth metal terminal.

What is claimed is:

1. A coil component comprising:

a drum core including a columnar winding core portion, a first flange portion connected to a first end of the winding core portion in a direction along a central axis of the winding core portion, and a second flange portion connected to a second end of the winding core portion opposite to the first end;

a first metal terminal attached to the first flange portion; and a wire wound around the winding core portion and having a first connection end joined to the first metal terminal, wherein the first flange portion protrudes outward with respect to the winding core portion in a first positive direction orthogonal to the central axis, when a direction from the first metal terminal toward the winding core portion in a direction along the central axis is an inward direction, a direction opposite to the inward direction is an outward direction, and a direction opposite to the first positive direction is a first negative direction, the first metal terminal includes a joining portion facing a surface of the first flange portion facing the first positive direction, a first connection end of the wire is joined to a joining surface of the joining portion facing the first positive direction, the joining portion includes an inclined surface inclined toward the first negative direction along the inward direction on the joining surface facing the first positive direction, and the inclined surface reaches an end of the joining portion in the inward direction, and when viewed in a direction orthogonal to both the first positive direction and the inward direction, an acute angle defined by a virtual straight line parallel to the central axis and a tangent at an end of the inclined surface in the inward direction is larger than an acute angle defined by the virtual straight line and a tangent at an end of the inclined surface in the outward direction.

2. The coil component according to claim 1, wherein the inclined surface includes a first inclined surface and a second inclined surface adjacent to the first inclined surface on a side of the inward direction.

3. The coil component according to claim 1, wherein a distance in the first positive direction from the end of the inclined surface in the inward direction to the end of the inclined surface in the outward direction is larger than an outer diameter of the wire.

4. The coil component according to claim 1, wherein the joining portion includes a horizontal surface adjacent to the inclined surface in the outward direction and orthogonal to the first positive direction, and the wire is joined to the horizontal surface.

5. The coil component according to claim 1, wherein the first flange portion includes an upper surface facing the joining portion, the upper surface being located on a side of the first negative direction with respect to the joining portion and an end of the upper surface in the inward direction is located further inward with respect to an end of the joining portion in the inward direction.

6. The coil component according to claim 1, wherein the first metal terminal further includes a mounting portion located closest to a side of the first positive direction in the first metal terminal, and an extending portion extending from the joining portion in the first positive direction and connected to the mounting portion, and a maximum dimension of the extending portion in the direction along the central axis is smaller than a maximum dimension of the joining portion in the direction along the central axis.

7. The coil component according to claim 1, further comprising:

a second metal terminal attached to the first flange portion;

a third metal terminal attached to the second flange portion;

a fourth metal terminal attached to the second flange portion; and when the wire is defined as a first wire, a second wire wound around the winding core portion and having a first connection end joined to the second metal terminal wherein when a specific axis orthogonal to the central axis is defined as a first axis, and an axis orthogonal to both the central axis and the first axis is defined as a second axis, and one of directions along the second axis is a second positive direction and a direction opposite to the second positive direction is a second negative direction, the second flange portion protrudes outward with respect to the winding core portion in the first positive direction orthogonal to the central axis, the first metal terminal is located on a side of the second positive direction with respect to a center of the first flange portion in a direction along the second axis, the second metal terminal is located on a side of the second negative direction with respect to a center of the first flange portion in the direction along the second axis, the third metal terminal is located on the side of the second positive direction with respect to a center of the second flange portion in the direction along the second axis, the fourth metal terminal is located on the side of the second negative direction with respect to the center of the second flange portion in the direction along the second axis, a second connection end of the first wire opposite to the first connection end is connected to the third metal terminal, and a second connection end of the second wire opposite to the first connection end is connected to the fourth metal terminal.

* * * * *